US012064696B2

(12) United States Patent
Li et al.

(10) Patent No.: US 12,064,696 B2
(45) Date of Patent: Aug. 20, 2024

(54) METHOD, APPARATUS, DEVICE AND STORAGE MEDIUM FOR DATA PROCESSING BASED ON LOCATION INFORMATION

(71) Applicant: Beijing Zitiao Network Technology Co., Ltd., Beijing (CN)

(72) Inventors: Longbo Li, Beijing (CN); Yunfei Li, Beijing (CN); Yang Zhang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/089,410

(22) Filed: Dec. 27, 2022

(65) Prior Publication Data
US 2023/0128235 A1   Apr. 27, 2023

Related U.S. Application Data

(63) Continuation of application No. PCT/CN2021/139617, filed on Dec. 20, 2021.

(30) Foreign Application Priority Data

Dec. 31, 2020  (CN) .......................... 202011623565.7

(51) Int. Cl.
A63F 13/795   (2014.01)
A63F 13/847   (2014.01)

(52) U.S. Cl.
CPC .......... *A63F 13/795* (2014.09); *A63F 13/847* (2014.09); *A63F 2300/308* (2013.01);
(Continued)

(58) Field of Classification Search
CPC ........................... A63F 13/795; A63F 13/216
See application file for complete search history.

(56) References Cited

U.S. PATENT DOCUMENTS 6,641,481 B1 * 11/2003 Mai ....................... A63F 13/795
                                                           463/29
9,131,339 B1 *  9/2015 Kulfan .................. H04W 8/245
(Continued)

FOREIGN PATENT DOCUMENTS

CN        101030235 A      9/2007
CN        105553821 A      5/2016
(Continued)

OTHER PUBLICATIONS

Extended European Search Report in EP21913998.7, mailed Jul. 4, 2023, 9 pages.

*Primary Examiner* — Jay Trent Liddle
(74) *Attorney, Agent, or Firm* — Astute IP Law Group (57) ABSTRACT

Method, apparatus, device, and storage-medium for data processing based on location information are provided. The method for data processing based on location information includes: obtaining first location information from a first account; determining a geographic label to which the first location information belongs, and associating the first account with a first-level group corresponding to the geographic label; receiving an interaction request from the first account; matching, in response to the interaction request, at least one second account to interact with the first account in the first-level group associated with the first account; and determining that the first account and the at least one second account belong to a same interaction group.

10 Claims, 7 Drawing Sheets

(52) U.S. Cl.
 CPC ... *A63F 2300/537* (2013.01); *A63F 2300/556* (2013.01); *A63F 2300/5573* (2013.01)

(56) References Cited

U.S. PATENT DOCUMENTS

| | | | |
|---|---|---|---|
| 9,545,565 B1 | 1/2017 | Kornmann et al. | |
| 9,669,293 B1* | 6/2017 | Kornmann | A63F 13/73 |
| 10,729,981 B1* | 8/2020 | Karlsen | G06Q 10/0639 |
| 11,478,715 B1* | 10/2022 | Wu | G06N 3/08 |
| 2007/0202953 A1 | 8/2007 | Taninami | |
| 2008/0256015 A1* | 10/2008 | Woolf | A63F 13/80 706/48 |
| 2009/0017913 A1* | 1/2009 | Bell | G06Q 40/12 463/40 |
| 2009/0075738 A1* | 3/2009 | Pearce | G07F 17/3274 709/218 |
| 2009/0239668 A1* | 9/2009 | Han | A63F 13/30 463/42 |
| 2009/0325712 A1* | 12/2009 | Rance | A63F 13/34 463/42 |
| 2012/0094762 A1* | 4/2012 | Khan | G06Q 50/01 463/43 |
| 2013/0072308 A1 | 3/2013 | Peck et al. | |
| 2013/0203499 A1* | 8/2013 | Oh | A63F 13/79 463/43 |
| 2014/0004960 A1* | 1/2014 | Soti | A63F 13/795 463/42 |
| 2014/0155156 A1 | 6/2014 | Peck et al. | |
| 2014/0274362 A1* | 9/2014 | Dhawan | A63F 13/798 463/29 |
| 2014/0274404 A1* | 9/2014 | Hoskins | A63F 13/335 463/42 |
| 2017/0259178 A1 | 9/2017 | Aghdale et al. | |

FOREIGN PATENT DOCUMENTS

| | | |
|---|---|---|
| CN | 105808781 A | 7/2016 |
| CN | 106457037 A | 2/2017 |
| CN | 107158708 A | 9/2017 |
| CN | 108465243 A | 8/2018 |
| CN | 108525289 A | 9/2018 |
| CN | 108786117 A | 11/2018 |
| CN | 110193202 A | 9/2019 |
| CN | 113144625 A | 7/2021 |
| JP | 2001134595 A | 5/2001 |
| JP | 2007229040 A | 9/2007 |
| JP | 2012232109 A | 11/2012 |
| JP | 2013059659 A | 4/2013 |
| JP | 2013192961 A | 9/2013 |
| KR | 20120105839 A | 9/2012 |
| KR | 20170104940 A | 9/2017 |

* cited by examiner

METHOD, APPARATUS, DEVICE AND STORAGE MEDIUM FOR DATA PROCESSING BASED ON LOCATION INFORMATION

CROSS REFERENCE TO RELATED APPLICATIONS

This application is a continuation of International Patent Application No. PCT/CN2021/139617, filed on Dec. 20, 2021, which claims the priority to and benefits of Chinese Patent Application No. 202011623565.7 filed on Dec. 31, 2020. The entire disclosure of the aforementioned applications is incorporated by reference as part of the disclosure of this application.

TECHNICAL FIELD

Embodiments of the present disclosure relate to a method, an apparatus, a device and a storage medium for data processing based on location information.

BACKGROUND

Various game products provided by entertainment product operators have gradually become the most important way of leisure and entertainment in nowadays network society. In a game product which requires participation of more than one person, during playing, game users can also have positive experiences such as communication and interaction, and achieve a feeling of team prestige. For game operators, there is a demand for development to increase the interaction depth between game users and improve the fun of the game products.

SUMMARY

According to an aspect of the present disclosure, a method for data processing based on location information is provided. The method includes: obtaining first location information from a first account; determining a geographic label to which the first location information belongs, and associating the first account with a first-level group corresponding to the geographic label; receiving an interaction request from the first account; matching, in response to the interaction request, at least one second account to interact with the first account in the first-level group associated with the first account; and determining that the first account and the at least one second account belong to a same interaction group.

According to another aspect of the present disclosure, an apparatus for data processing based on location information is provided. The apparatus includes: an acquisition unit configured to obtain first location information from a first account; an association unit configured to determine a geographic label to which the first location information belongs, and associate the first account with a first-level group corresponding to the geographic label; a receiving unit configured to receive an interaction request from the first account; a matching unit configured to match, in response to the interaction request, at least one second account to interact with the first account in the first-level group associated with the first account; and a combination unit configured to determine that the first account and at least one second account belong to a same interaction group.

According to yet another aspect of the present disclosure, a computer device is provided. The computer device includes processor, a memory, and a computer program stored on the memory, in which, the processor executes the computer program to implement steps of the above-mentioned method for data processing based on location information.

According to yet another aspect of the present disclosure, a computer-readable storage medium on which a computer program is stored is provided. The computer program, upon being executed by a processor, cases the processor to perform steps of the above-mentioned method for data processing based on location information.

BRIEF DESCRIPTION OF THE DRAWINGS

In order to illustrate the technical solutions of the embodiments of the present disclosure or of the related art more clearly, the following briefly introduces the accompanying drawings used in the description of the embodiments. Apparently, the accompanying drawings in the following description are only some embodiments of the present disclosure. For those of ordinary skill in the art, other drawings can also be obtained based on these drawings without creative work.

DETAILED DESCRIPTION

The technical solutions in the embodiments of the present disclosure will be clearly and completely described below with reference to the accompanying drawings. Apparently, the described embodiments are only some of the embodiments of the present disclosure, but not all of the embodiments. Based on the embodiments of the present disclosure, all other embodiments obtained by those of ordinary skill in the art without creative efforts also fall within the protection scope of the present disclosure.

As used in this disclosure, "first", "second" and similar terms do not denote any order, quantity, or importance, but are merely used to distinguish the various components. Likewise, a term such as "including" or "comprising" means that elements or things appearing before the term encompass elements or things recited after the term and their equivalents, but do not exclude other elements or things. A term such as "connected to" or "connected with" are not limited to physical or mechanical connections, but can include electrical connections, regardless directly or indirectly.

Online games are entertainment products provided by online game operators, which game users can participate in through mobile terminals, fixed terminals and other electronic devices. In a two-player or multi-player game, online game operators can formulate corresponding rules to team up game accounts participating in the game, for example, allocate corresponding teammate accounts and opponent accounts for a game account in response to a request to start a game. After the game teams are successfully formed, the team members of the game can also conduct interaction such as chat, strategy discussion, friend interaction, and so on, during the game operation.

Generally, the game teams are formed randomly, which leads to lack of relevance between team members (including teammates and opponents) playing the game, that is, users are unfamiliar with each other and have low relevance. This makes the interaction between game participants awkward and not likely to have resonance. In addition, the game content provided by different teams based on this random team formation method is also indistinguishable and cannot provide personalized game services for game users, which leads to a monotonous game experience.

The present disclosure provides a method, an apparatus, and a device for data processing based on location information and a storage medium, which can team up interaction members based on location information obtained from user accounts, improve the fun in interaction, and promote interaction users to obtain deeper interaction experience.

In the method, the apparatus, and the device for data processing based on location information and the storage medium provided by the embodiments of the present disclosure, first location information is obtained from a first account, and the first account is made to be associated with a corresponding first-level group based on a geographic label to which the first location information belongs, and interaction team matching is performed in the first-level group after receiving an interaction request from the first account. Thus, the accounts in the interaction group can have geographic relevance. This interaction grouping method with a geographic location as a link is beneficial to making users in the same group have a deeper interaction experience in the interaction process, thus improving entertainment and increasing fun.

The method for data processing provided according to some embodiments of the present disclosure is used to form game teams based on location information obtained from game accounts. It can improve the fun of the game, and promote game users to obtain a deeper interaction experience. As an example, the method for data processing can be applied to online games on mobile terminal devices, or the method for data processing can also be applied to online games on fixed terminal devices, which is not limited herein. In this article, an account represents a game account. A user can log in to an account on a device by means of a game application to perform corresponding game operations. The account can include a user attribute, a game level and other account information. For the convenience of description, in this article, unless otherwise defined, a user logs in a game account on a device, that is, the device and the account are in a one-to-one correspondence. For example, a first device can represent a device on which a first account is logged, and a second device can represent a device on which another account except the first account is logged. It can be understood that in some cases, two or more accounts can also be logged on to one device, and the method disclosed herein is also applicable to such case.

Figure 1:
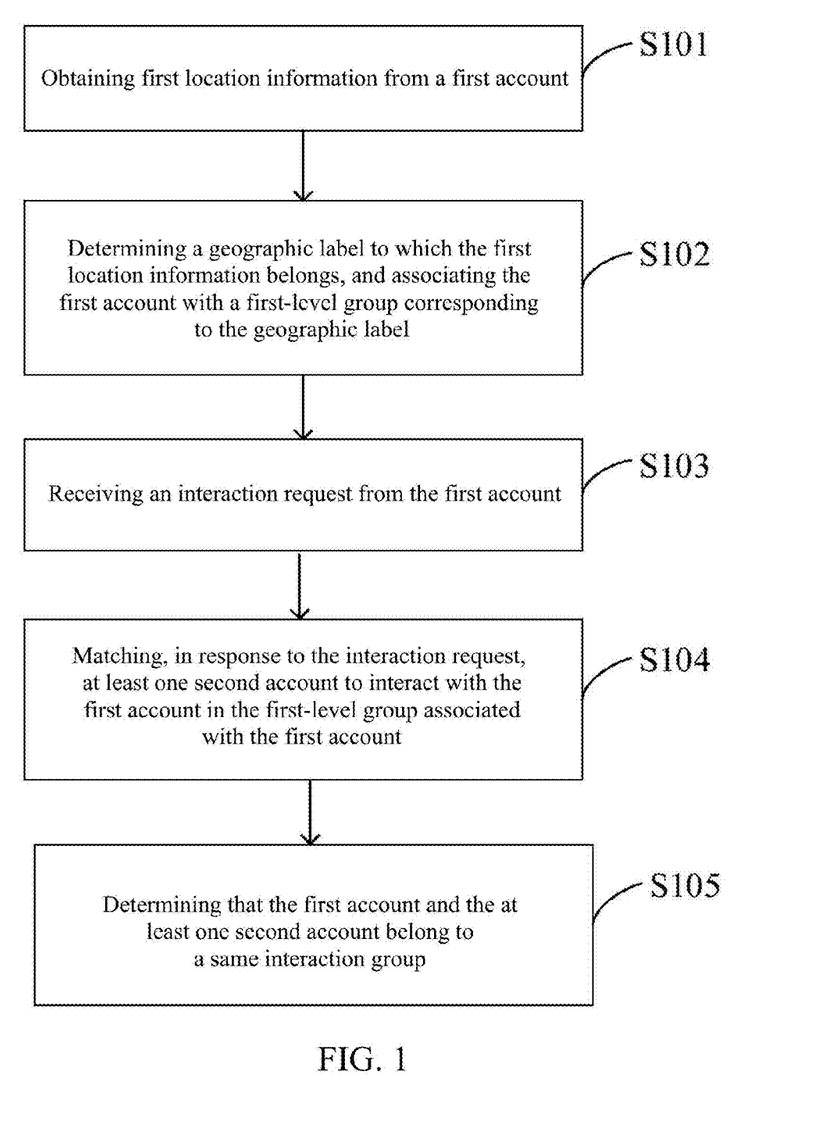
FIG. 1 illustrates a schematic flowchart of a method for data processing based on location information provided by the present disclosure.

FIG. 1 illustrates a schematic flowchart of a method for data processing based on location information provided by the present disclosure. As shown in FIG. 1, the method can include steps S101-S105. In at least some embodiments, the data processing method can be performed by, for example, a game operator server (hereinafter referred to as a server).

Specifically, in step S101, first location information is obtained from a first account. For example, the first account can correspond to a first user, and the first user logs in to the first account on the first device. For example, the first device can be a mobile terminal device, a fixed device, and the like. Taking interaction as a game product as an example, the first device can be installed with a game application, or a game application link displayed in other applications, through which users can obtain a game application from a server (such as cloud service) to the first device through small programs, quick applications, or the like. This allows users to implement game application operations.

As an example, the first account is described below as a terminal device operated by a first user. In some examples, the first location information can be coordinate information used to indicate a location of the first device, such as location coordinates obtained by a positioning unit (such as GPS, Beidou, etc.) in the first device. In some other examples, the first location information can also be information indicating a geographic location based on which the first user expects to team up for a game. The specific process of the server obtaining the first location information from the first account will be described in detail below.

Next, in step S102, a geographic label to which the first location information belongs is determined, and the first device is made to be associated with a first-level group corresponding to the geographic label. The geographic label can be location coordinates, a place name, a geographic identifier and other information used to indicate a location. For example, the geographic label can be a name of a prefecture level city, such as Wuhan, Changsha, Luoyang, etc. The geographic label is a basis for grouping game users. For example, users with the same geographic label can be divided into the same group. For example, in the method according to some embodiments of the present disclosure, different geographic labels can be assigned to different prefecture level cities for geographic division. After receiving the first location information of the first account, the server can match the first location information through a predetermined geographic label database (such as a database that associates longitudes and latitudes with place names), to determine a geographic label to which the first location information belongs, such as "Wuhan". Then the first account is made to be associated with the first-level group corresponding to Wuhan. It can be understood that, in addition to dividing based on administrative regions, other approaches can also be used for regional division. As an example, geographic area can be used. For example, every 10000 square meters of area can be regarded as a geographic unit, and geographic labels can be allocated respectively to the geographic units.

According to some embodiments of the present disclosure, associating the first account with the first-level group can refer to creating different member lists or member queues for different geographic labels and storing the member lists or the member queues separately. For example, the server can manage accounts corresponding to different geographic labels by maintaining a plurality of lists. When forming a team, game members can be matched according to the list to assign accounts with the same geographic label to the same game team. As an example, the server can assign some game accounts in the account list corresponding to "Wuhan" to the same game team.

According to some other embodiments of the present disclosure, associating the first account with the first-level group can be implemented by adding attributes, tags, etc. to the account. For example, accounts with the same geographic label are assigned with the same geographic identifier. When forming a team, game accounts can be matched according to the geographic identifier to assign accounts with the same geographic label to the same game team. As an example, the server can assign game accounts with a geographic identifier corresponding to "Wuhan" to the same game team.

Next, as shown in FIG. 1, in step S103, an interaction request from the first account is received. For example, the interaction request is a request to start a game. The game request can refer to a request sent to the server by the first device where the first account is located, which is used to request the server to form a game team and complete the corresponding game configuration. In step S104, in response to the game request, at least one second account to play with the first account is matched in the first-level group associated with the first account. The second account refers to another account that is to be teamed up with the first account to play a game. The second account can be one or more, and can correspond either a teammate or an opponent. The number of second accounts can be limited according to specific rules of the game. For example, the first account can refer to an account A, while at least one second account can correspond to an account B, an account C and an account D.

In this article, the first account is taken as an example to describe the method according to the present disclosure which is performed between the server and the first account. It can be understood that the server can also similarly perform data transmission with the second account to implement the method according to the present disclosure.

In some examples, the above steps S101-S102 can be performed prior to steps S103-S104, for example, steps S101-S102 can be performed when entering the game application. Then, the game user can, for example, complete basic operations such as receiving a task, punching in every day and so on in the game application corresponding to the first account. Then, the game user can send a game request through the first device, so that the server can perform step S103, that is, receiving a game request, and step S104, matching the game players. In other examples, the above steps S101-S102 can also be performed after step S103. For example, after receiving the game request sent by the game account, the server obtains the first location information of the first account and associates the first account with the first-level group corresponding to the geographic label. It can be understood that in this article, the execution order of the above steps is not limited.

Then, as shown in FIG. 1, in step S105, the first account and at least one second account are determined to belong to the same interaction group. For example, when the interaction is based on a game product, the interaction group can be a game group, that is, a group in which the accounts play a game together. The server can combine the matched at least one second account to form a game group with the first account, for example, as members of this round of game. For example, after the game group is formed, the server can send a game matching success message to the accounts in the game group, and transmit corresponding game content and other data.

Step S101 will be described in detail below with reference to FIGS. 2 to 4. The involved interaction is interaction based on a game product as a specific example. It can be understood that the method provided according to the present disclosure can also be applied to other types of interaction requiring grouping, which is not limited.

According to some embodiments of the present disclosure, step S101 can include: receiving first location information from the first account, wherein the first location information received from the first account is obtained by: obtaining the first location information based on information input through an input panel of the first device corresponding to the first account.

Figure 2:
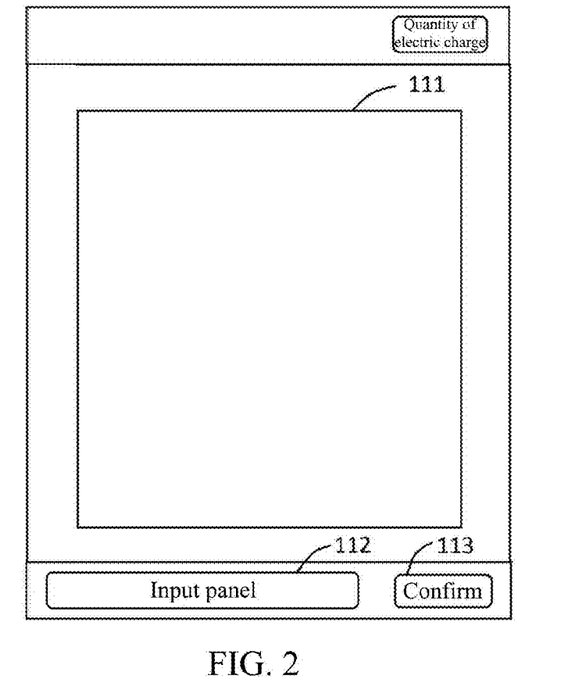
FIG. 2 illustrates a schematic diagram of a first device obtaining first location information through an input panel according to embodiments of the present disclosure.

FIG. 2 illustrates a schematic diagram of a first device obtaining first location information through an input panel according to embodiments of the present disclosure. As an example, as shown in FIG. 2, the first device can have a display page 111, an input panel 112, and a confirmation button 113. The display page can also be represented as a display window. Here, for example, the display page 111 can present game related information, such as prompt information for requesting to obtain the first location information. The game user can, for example, type first location information through the input panel 112, such as "Wuhan", and confirm the entered information through the confirmation button 113. Next, the first device can send the first location information obtained through the input panel 112 to the server as the first location information of the first account.

According to other embodiments of the present disclosure, the step S101 can include: receiving first location information from the first account, wherein the first location information received from the first account is obtained by: obtaining the first location information based on a voice received by a voice acquisition unit of the first device corresponding to the first account.

Figure 3:
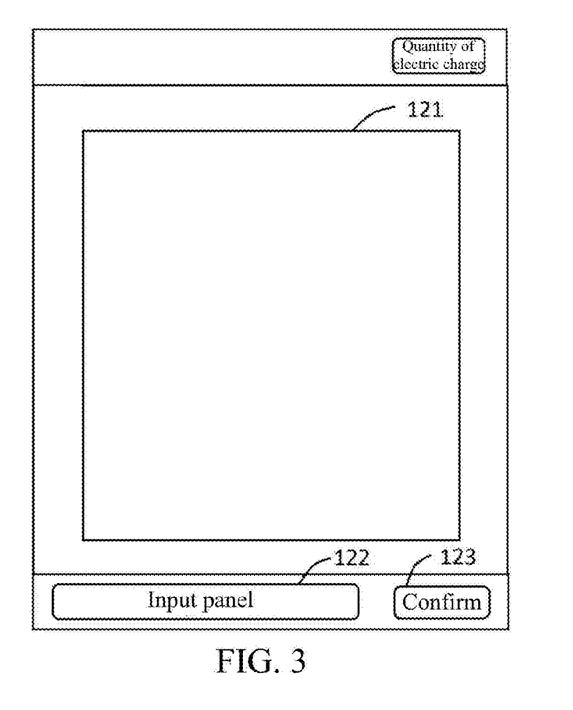
FIG. 3 illustrates a schematic diagram of a first device obtaining first location information through a voice acquisition unit according to embodiments of the present disclosure.

FIG. 3 illustrates a schematic diagram of a first device obtaining first location information through a voice acquisition unit according to embodiments of the present disclosure. As an example, as shown in FIG. 3, the first device can have a display page 121, a voice acquisition unit 122, and a confirmation button 123. Information related to the game can be presented on the display page 121, such as prompt information for requesting to obtain the first location information. The game user can obtain the first location information by voice, for example, through the voice acquisition unit 122. For example, the user can press and hold the button corresponding to 122 and emit the voice of "Wuhan", and then confirm the location information based on voice recognition through the confirmation button 123. Next, the first device can send the first location information obtained by the voice acquisition unit 122 to the server as the first location information of the first account.

According to other embodiments of the present disclosure, step S101 can include: receiving first location information from the first account, wherein the first location information received from the first account is obtained by: presenting a map on the display page of the first device corresponding to the first account, and obtaining the first location information from coordinates on the map of an operation point received on the display page.

Figure 4:
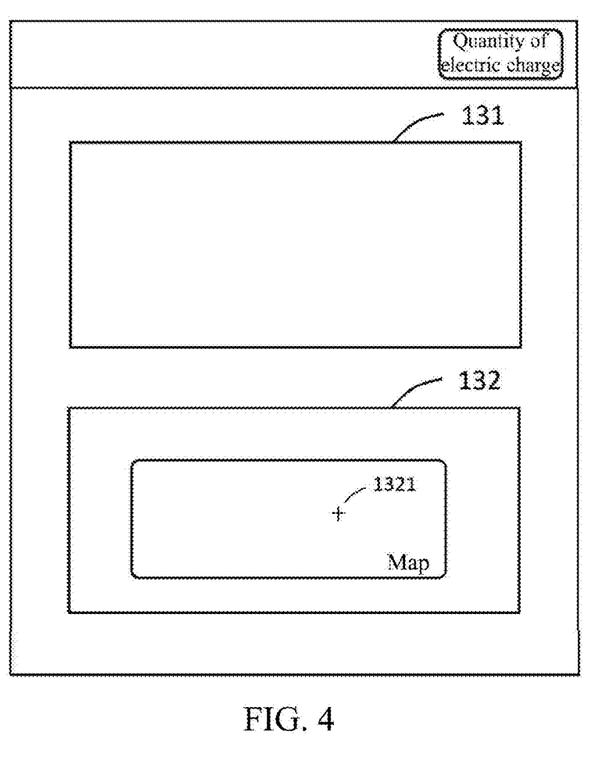
FIG. 4 illustrates a schematic diagram of a first device obtaining first location information through a displayed map according to embodiments of the present disclosure.

FIG. 4 illustrates a schematic diagram of a first device obtaining first location information through a displayed map according to embodiments of the present disclosure. As an example, as shown in FIG. 4, the first device can have a display page 131 and a display page 132, wherein the display page 131 can present game related information, such as prompt information for requesting to obtain the first location information, and the display page 132 can present a map. The game user can, for example, operate on the map of the display page 132. For example, through the operation point 1321, the first device can determine the first location information based on the operation point 1321, and send the first location information to the server as the first location information of the first account.

In the above embodiment, the first location information obtained is determined by the game user, that is, the first location information represents geographic information according to which the game user intends to be teamed up for a game. In other embodiments, the first location information can also be obtained through a positioning unit of the first device. In this case, obtaining the first location information from the first account includes: requesting location authorization from the first account, and when location authorization is obtained, obtaining the first location information based on the location information of the positioning unit of the first device corresponding to the first account. For example, after obtaining the location authorization, the first device can send the location information determined by the positioning unit, such as location coordinates, to the server as the first location information of the first account. In addition, in further embodiments according to the present disclosure, the first device can include a storage unit on which first location information is stored. In this case, the first device can directly send the stored first location information to the server as the first location information of the first account.

According to embodiments of the present disclosure, matching at least one second account (step S104) can include the following steps: determining a target matching number, wherein the target matching number is used to indicate a number of second accounts to be determined; and determining a number of second accounts in the first-level group, that is, determining the number of second accounts in the first-level group to which the first account belongs. As an example, the second account can correspond to the second device, that is, for example, a second user logs into the second account in an application of the second device to perform a game operation. The second account can be a game account similar to the first account. Similarly, the server can also perform the above steps S101-S104 for the second account, that is, determine that the second account belongs to the first-level group based on second location information of the second account. Then, the target matching number can be compared with the number of second accounts in the first-level group. By comparison, the server can learn about whether the number of second accounts in the current first-level group is enough for game team formation.

If the number of the second accounts in the first-level group is larger than or equal to the target matching number, the target matching number of second accounts are determined in the first-level group. In this case, the second accounts in the current first-level group are enough for game team formation. Generally, when the number of participants in the game is large, there are a large number of second accounts to be matched in the first-level group. Therefore, it is also possible to further determine the target matching number of second accounts in the first-level group based on the user level information of the first account. In other words, in this case, accounts with the same user level in the first-level group can be formed in one team, which can make the game accounts that have successfully teamed up have similar game levels, thus increasing the matching degree of game users.

When the number of the second accounts in the first-level group is smaller than the target matching number, a waiting time of the first account is monitored, and when the waiting time exceeds a waiting threshold, the target matching number of second accounts are determined in a second-level group. In this case, the second accounts in the first-level group are not enough for game team formation. At this time, the waiting time of the first account is monitored and a waiting threshold (such as 10 seconds) is set. In order to avoid reducing the user experience in the game due to a long time in waiting for matching, when the waiting time exceeds a waiting threshold and the second accounts have been matched in the first-level group are not enough to reach the target matching number, the second accounts can be determined from a second-level group. According to some embodiments of the present disclosure, the first-level group belongs to a first division level including geographic labels, the second-level group belongs to a second division level including geographic labels, and the second division level is higher than the first division level. As an example, if the first division level is city level and the first-level group corresponds to Wuhan, the second division level can be provincial, and the second-level group can correspond to Hubei Province. In this case, it means that the number of people currently participating in the game is small. Therefore, the server can determine the target matching number of second accounts in the second-level group randomly. That is, when the number of players in the game is small, team formation can be performed without further waiting, regardless of the game levels of the accounts, so as to avoid long waiting time and reduce the user experience in the game.

In addition, according to some embodiments of the present disclosure, if the number of second accounts in the second-level group is still smaller than the target matching number, the server can further perform game team matching in a third-level group corresponding to a national level.

In the method according to embodiments of the present disclosure, the matching can be performed preferably based on the obtained geographic location information, so that the accounts for game team formation have the same geographic labels as much as possible. When there is a small number of users, the matching scope can be expanded level by level according to the geographic division to ensure that enough accounts can enter the game in a short time. In this way, accounts that can successfully make a team have a high regional relevance. Due to the regional relevance, this part of game users are more likely to have similar habits, growth experiences, and be affected by similar human and geographic factors, which makes it easier for users to find common topics and communicate more smoothly in the process of game interaction, such as chat, strategy analysis, etc., which is beneficial for establishing deeper interaction between game users.

After the game team is successfully formed through the above steps, that is, the target matching number of second accounts and the first account are determined as one game team. The method according to embodiments of the present disclosure can also include: sending first data to accounts in the game group (the target matching number of second accounts and the first account) to present a combination success message of the game group on display pages of devices corresponding to the accounts in the game group. The devices corresponding to the accounts in the game group can include the first device corresponding to the first account and at least one second device corresponding to at least one second account.

Figure 5A:
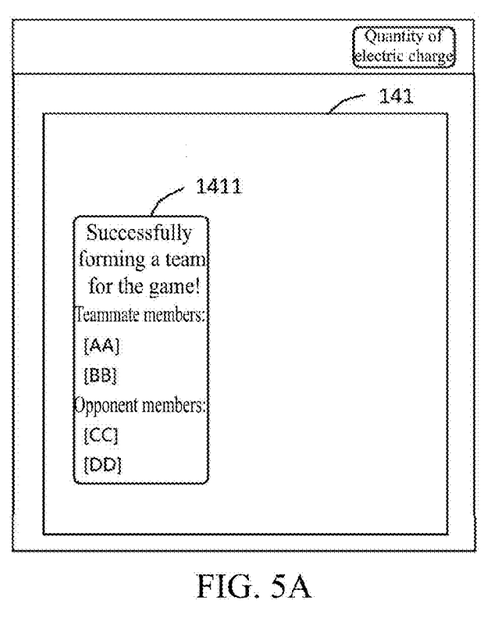
FIG. 5A illustrates a schematic diagram of presenting a combination success message of an interaction group according to embodiments of the present disclosure.

FIG. 5A illustrates a schematic diagram of presenting a combination success message of an interaction group according to embodiments of the present disclosure. For example, FIG. 5A can correspond to the first device including a display page 141 on which a game combination success message 1411 is presented. Based on the display content of 1411 presented on the display page, the game user can understand that the members for playing the current game have formed a team successfully. It is understood that the second device can also present content similar to that shown in FIG. 5A.

Figure 5B:
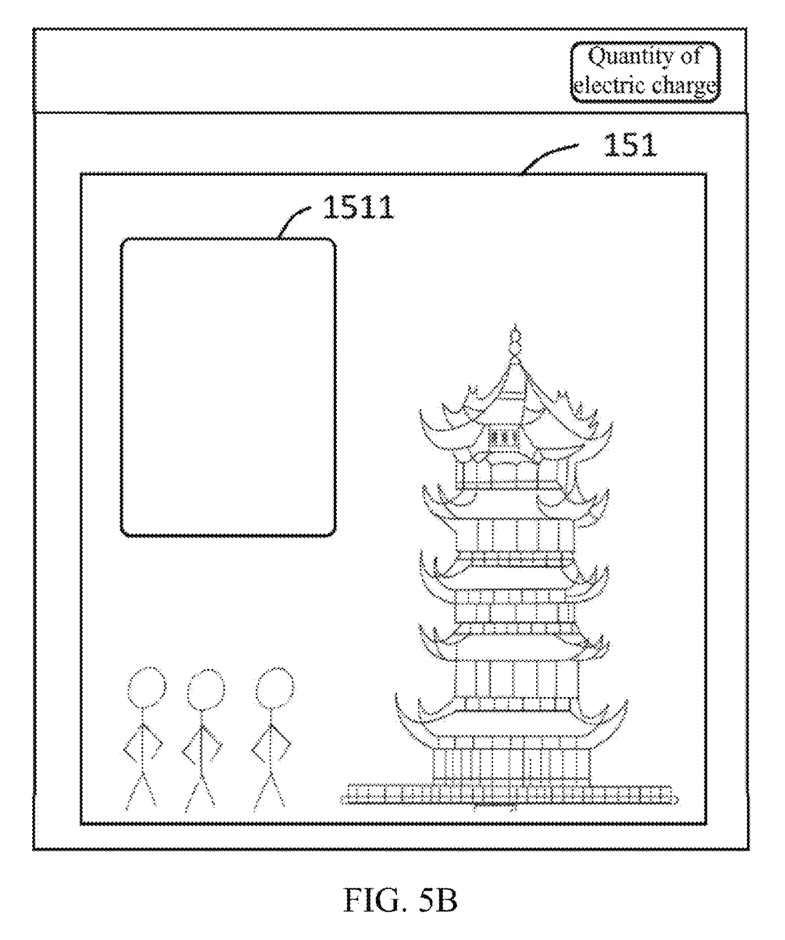
FIG. 5B illustrates a schematic diagram of presenting game information associated with a geographic label according to embodiments of the present disclosure.

For example, the method according to embodiments of the present disclosure can also include: sending second data to accounts in the game group to present game information associated with the geographic label on display pages of devices corresponding to the accounts in the game group. As an example, the game information associated with the geographic label includes at least one of: a game scene built based on the geographic label; geographic knowledge based on the geographical label. FIG. 5B illustrates a schematic diagram of presenting game information associated with a geographic label according to embodiments of the present disclosure. For example, FIG. 5B can correspond to a first device, which includes a display page 151 on which a window 1511 is presented, for example, chat information of game users can be presented in 1511. In addition, the display page 151 can also present a game scene corresponding to the geographic label (such as Wuhan), such as the Yellow Crane Tower scene shown in FIG. 5B. Furthermore, the window 1511 can also present a geographic knowledge question based on the geographic label, such as a question related to the Yellow Crane Tower scene, game tips and other information.

Figure 6:
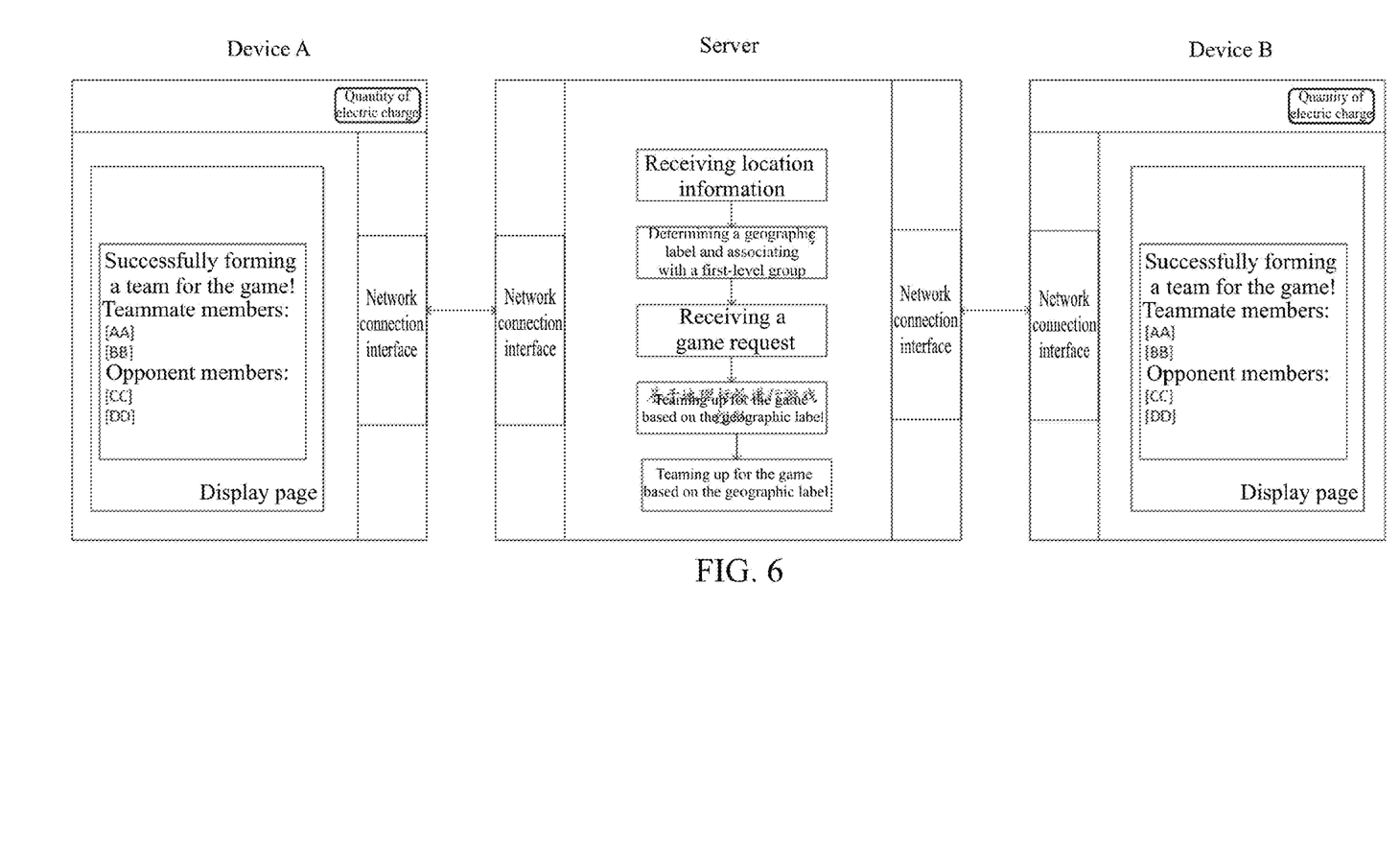
FIG. 6 illustrates a schematic diagram of implementing a method for data processing according to some embodiments of the present disclosure.

As a specific example, FIG. 6 illustrates a schematic diagram of implementing a method for data processing according to some embodiments of the present disclosure. FIG. 6 schematically shows a game server, a device A, and a device B. For example, the device A can be the device on which an account A logs in, and the device B can be the device on which an account B logs in. As shown in FIG. 6, by means of a network connection interface, the game server can receive location information from the account A and the account B respectively. Based on the received location information, the geographic label can be determined, and the accounts are made to be associated with the first-level group corresponding to the geographic label. After receiving a game request, the server can team up for a game in the first-level group based on the geographic label to form a game group. Then, the server can send game related data to the accounts in the game group, such as the first data described above, to present a notice of successfully forming a team for the game on the display pages of the device A and the device B (as shown in FIG. 5A). Further, the server can also send the second data described above to the accounts in the game group to present game information associated with the geographic label on the display pages of the device A and the device B, such as the game scenario shown in FIG. 5B.

Through the above methods, the server can first match opponents and teammates with similar customs and cultural knowledge for the game accounts based on the obtained location information, so as to promote them to spend a time in a game together and have the opportunity to know each other. In addition, after the game team is formed based on geographic information, personalized game content related to the geographic label can be further provided for the group of game accounts to enrich the game experience.

As an example, for a game team determined based on a geographic label of Beijing, a game scene built based on Beijing can be provided for the game team for going through the content of the game, so that every member can experience the familiar scene. As another example, for a game team determined based on a geographic label of Hebei, relevant knowledge about Hebei can be provided for the game team, to guide game users to learn and exchange cultural content familiar to each other.

Such game grouping method with geographical location as the link is beneficial for making game users in the same team have a deeper interaction experience in the game process, thus improving the entertainment and increase the fun of the game.

Figure 7:
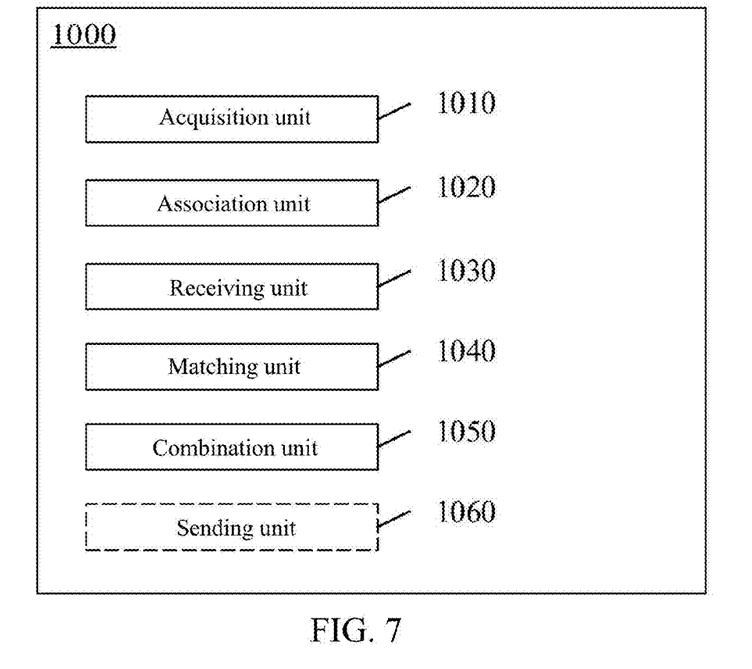
FIG. 7 illustrates a schematic block diagram of an apparatus for data processing based on location information provided by the present disclosure.

According to another aspect of the present disclosure, an apparatus for data processing based on location information is also provided. FIG. 7 illustrates a schematic block diagram of an apparatus for data processing based on location information provided by the present disclosure. As shown in FIG. 7, the apparatus 1000 for data processing based on location information can include: an acquisition unit 1010, an association unit 1020, a receiving unit 1030, a matching unit 1040, and a combination unit 1050.

According to embodiments of the present disclosure, the acquisition unit 1010 can be configured to obtain first location information from a first account. The association unit 1020 can be configured to determine a geographic label to which the first location information belongs, and associate the first account with a first-level group corresponding to the geographic label. The receiving unit 1030 can be configured to receive a game request from the first account. The matching unit 1040 can be configured to match, in the first-level group associated with the first account, at least one second account to play with the first account in response to the game request. The combination unit 1050 can be configured to form a game group with the first account and at least one second account.

According to embodiments of the present disclosure, in at least one example, the acquisition unit 1010 can be configured to receive first location information from a first account. As an example, the first location information received from the first account is obtained by one of the following: obtaining the first location information based on information input through an input panel of the first device corresponding to the first account; obtaining the first location information based on a voice received by a voice acquisition unit of the first device; or presenting a map on a display page of the first device and obtaining the first location information from coordinates on the map of an operation point received on the display page.

According to embodiments of the present disclosure, in at least one example, the acquisition unit 1010 can be configured to request location authorization from the first account, when location authorization is obtained, the acquisition unit 1010 can obtain the first location information based on location information of a positioning unit of the first device corresponding to the first account.

According to embodiments of the present disclosure, the acquisition unit 1010 can be configured to receive, from the first account, first location information stored in a storage unit of the first device corresponding to the first account. The storage unit can be, for example, a volatile memory or a nonvolatile memory, and the stored location information can be obtained from use history data of the account, such as use history stored in the first device per se, or obtained by connecting to a server through a communication network, for example.

According to embodiments of the present disclosure, in at least one example, the matching unit 1040 can be configured to determine at least one second account according to the following steps: determining a target matching number; determining a number of second accounts in the first-level group; when the number of the second accounts in the first-level group is larger than or equal to the target matching number, determining the target matching number of second accounts in the first-level group; or, when the number of second accounts in the first-level group is smaller than the target matching number, monitoring a waiting time of the first account, and when the waiting time exceeds a waiting threshold, determining the target matching number of second accounts in a second-level group. As an example, the first-level group belongs to a first division level including the geographical label, the second-level group belongs to a second division level including the geographical label, and the second division level is higher than the first division level.

According to embodiments of the disclosure, in at least one example, the first division level corresponds to a municipal administrative division level, and the second division level corresponds to a provincial administrative division level.

According to embodiments of the present disclosure, in at least one example, the matching unit 1040 can also be configured to determine the target matching number of second accounts in the first-level group based on user level information of the first account.

According to embodiments of the present disclosure, in at least one example, the matching unit 1040 can also be configured to randomly determine the target matching number of second accounts in the second-level group.

The apparatus 1000 for data processing according to some embodiments of the present disclosure can also include a sending unit 1060 configured to send first data to accounts in the game group, to present a combination success message of the game group on display pages of devices corresponding to the accounts in the game group.

According to embodiments of the present disclosure, in at least one example, the sending unit 1060 can also be configured to send second data to accounts in the game team, to present game information associated with the geographic label on display pages of devices corresponding to the accounts in the game team.

According to embodiments of the present disclosure, in at least one example, the game information associated with the geographic label includes at least one of the following: a game scene built based on the geographic label; a geographic knowledge question based on the geographic label.

The specific steps performed by the apparatus 1000 for data processing based on location information and the procedure thereof can refer to the above description of the method for data processing based on location information according to the present disclosure, and the technical effect similar to the above method can be achieved, so the description will not be repeated here.

Figure 8:
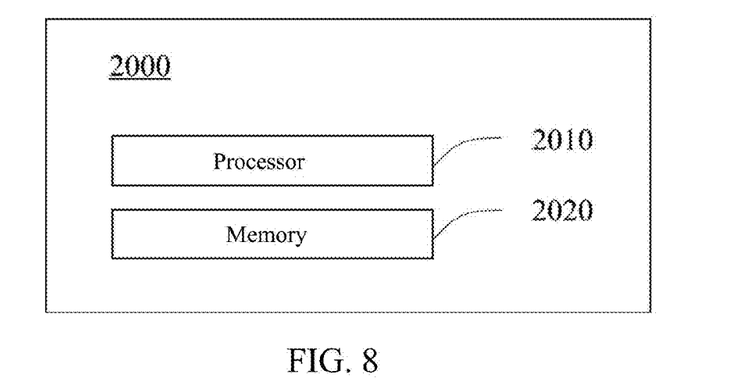
FIG. 8 illustrates a schematic block diagram of a computer device provided by the present disclosure.

According to another aspect of the present disclosure, there is also provided a computer device, and FIG. 8 illustrates a schematic block diagram of a computer device provided by the present disclosure.

As shown in FIG. 8, a computer device 2000 can include a processor 2010 and a memory 2020, where a computer program (such as program instructions, code, etc.) is stored on the memory 2020. The processor 2020 can perform the computer program to implement the steps of the method for data processing based on location information described above. For example, the computer device 2000 can correspond to the above game operator server.

In at least one example, the processor 2010 can perform various actions and processes according to computer programs stored in the memory 2020. For example, the processor 2010 can be an integrated circuit chip with signal processing capability. The above processor can be a general-purpose processor, a digital signal processor (DSP), an application specific integrated circuit (ASIC), an off-the-shelf programmable gate array (FPGA) or other programmable logic devices, or transistor logic devices, discrete hardware components. The processor can implement or perform various methods, steps and logic diagrams disclosed in the embodiments of the present disclosure. The general processor can be a microprocessor or any conventional processor, which can be X86 architecture or ARM architecture.

The memory 2020 stores with computer executable computer program, which can implement the method provided according to the embodiments of the present disclosure when executed by the processor 2010. The memory 2020 can be a volatile memory or a non-volatile memory, or can include both a volatile and a non-volatile memory. The non-volatile memory can be a read only memory (ROM), a programmable read only memory (PROM), an erasable programmable read only memory (EPROM), an electrically erasable programmable read only memory (EEPROM) or a flash memory. The volatile memory can be a random-access memory (RAM), which is used as an external cache. By way of illustration but not limitation, many forms of RAM are available, such as a static random-access memory (SRAM), a dynamic random-access memory (DRAM), a synchronous dynamic random-access memory (SDRAM), a double data rate synchronous dynamic random-access memory (DDRS-DRAM), an enhanced synchronous dynamic random-access memory (ESDRAM), a synchronous connection of dynamic random-access memory (SLDRAM) and a direct memory bus random access memory (DR RAM). It should be noted that the memory of the above methods described herein is intended to include, but not limited to, these and any other suitable types of memory.

According to other embodiments of the present disclosure, the computer device 2000 can also include a display (not shown) to enable visualization of, for example, a computer operator. For example, the operation information, data processing, etc. in the process of implementing the above method can be displayed on the display, or the computer program can also be displayed without limitation. In addition, the computer device 2000 can also include necessary components such as an interaction interface, an input device, a communication unit, etc., which are used to implement information interaction between the computer, an operator, and other devices. For example, the operator can modify the computer program through the input device.

Figure 9:
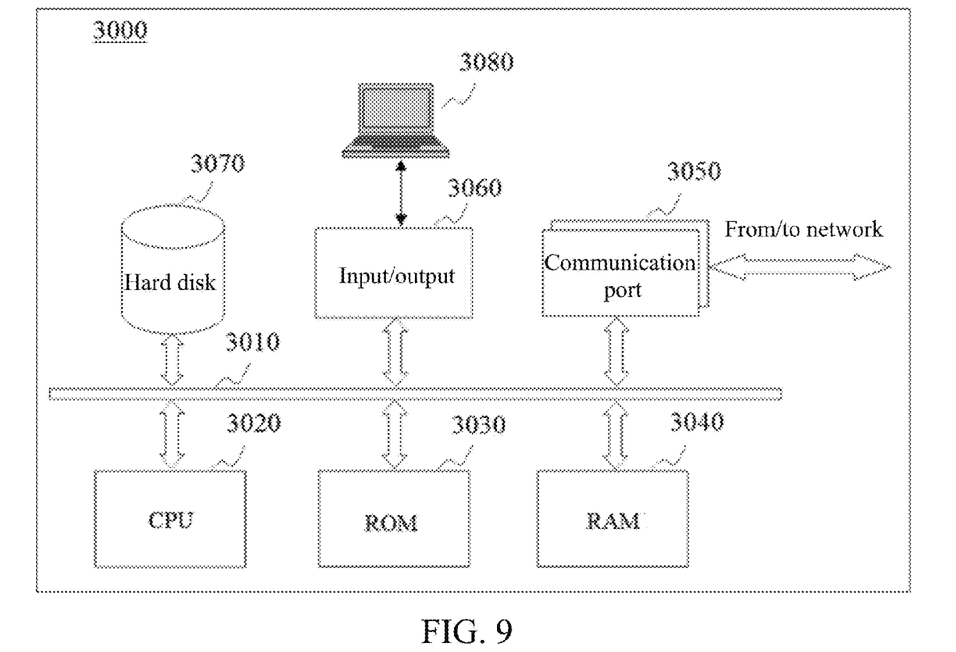
FIG. 9 illustrates an architectural diagram of an exemplary computing device according to embodiments of the present disclosure.

As an exemplary embodiment, the apparatus 1000 or the computer device 2000 according to the present disclosure can be implemented as a computing device as shown in FIG. 9.

FIG. 9 illustrates a schematic block diagram of an exemplary computing device according to an embodiment of the present disclosure. The computing device 3000 can include a bus 3010, one or more CPUs 3020, a read-only memory (ROM) 3030, a random-access memory (RAM) 3040, a communication port 3050 connected to a network, an input/output component 3060, a hard disk 3070, and the like. The storage device in the computing device 3000, such as a ROM 3030 or a hard disk 3070, can store various data or files involved in the processing and/or communication of the method for data processing based on location information provided in the present disclosure, as well as computer programs executed by the CPU. The computing device 3000 can also include a user interface 3080. However, the architecture shown in FIG. 9 is only illustrative. When implementing different devices, one or more components of the computing devices shown in FIG. 9 can be omitted according to actual needs, or the required components can be added to the computing devices shown in FIG. 9, which is not limited herein.

Figure 10:
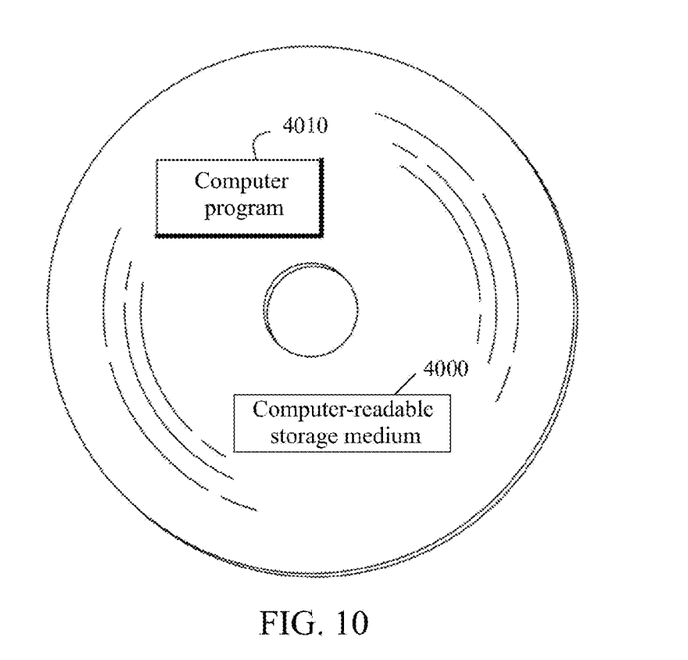
FIG. 10 illustrates a schematic block diagram of a computer-readable storage medium provided by the present disclosure.

According to another aspect of the present disclosure, there is also provided a computer-readable storage medium, and FIG. 10 illustrates a schematic block diagram of a computer-readable storage medium provided by the present disclosure.

As shown in FIG. 10, a computer program 4010 is stored on the computer-readable storage medium 4000, wherein the computer program 4010 implements the steps of the method for data processing based on location information described above when executed by the processor. In at least one example, the computer-readable storage medium 4000 includes, but is not limited to, a volatile memory and/or a non-volatile memory. The volatile memory can include, for example, a random-access memory (RAM) and/or a cache memory. The nonvolatile memory can include, for example, a read-only memory (ROM), a hard disk, a flash memory, and the like. For example, the computer-readable storage medium 4000 can be connected to a computing device such as a computer (e. g., as shown in FIG. 9). Then, when the computing device runs the computer program 4010 stored on the computer-readable storage medium 4000, the above method provided by the present disclosure can be performed.

According to another aspect of the present disclosure, there is also provided a computer program product, including a computer program. In at least one example, when the computer program is executed by the processor, the steps of the method for data processing based on location information described above can be implemented.

Those skilled in the art can understand that the content disclosed in the present disclosure can be subject to various variations and improvements. For example, various devices or components described above can be implemented by hardware, software, firmware, or some or all of the three.

In addition, although the present disclosure makes various references to some units in the system according to the embodiments of the present disclosure, any number of different units can be used and run on the client and/or server. The units are merely illustrative, and different units can be used for different aspects of systems and methods.

A flowchart is used in the present disclosure to illustrate the steps of a method according to embodiments of the present disclosure. It should be understood that the previous or subsequent steps are not necessarily carried out in a precise order. Instead, the various steps can be processed in reverse order or simultaneously. Other operations can also be added to these procedures.

Those skilled in the art can understand that all or part of the steps in the above method can be completed by instructing related hardware through a computer program, and the program can be stored in a computer-readable storage medium, such as a read-only memory, a disk, or an optical disk. Alternatively, all or part of the steps of the above embodiments may also be implemented using one or more integrated circuits. Accordingly, each module/unit in the above embodiments can be implemented in the form of hardware or software functional modules. The present disclosure is not limited to the combination of any specific form of hardware and software.

Unless otherwise defined, all terms used herein have the same meaning as that commonly understood by those skilled in the art to which this disclosure belongs. It should also be understood that terms such as those defined in the general dictionary should be interpreted as having meanings consistent with their meanings in the context of relevant technologies, and should not be interpreted in an idealized or highly formalized sense, unless explicitly defined here.

The above is merely a description of the present disclosure and should not be considered as a limitation. Although several exemplary embodiments of the present disclosure have been described, those skilled in the art will easily understand that many modifications can be made to the exemplary embodiments without departing from the novel teaching and advantages of the present disclosure. Therefore, all these modifications are intended to be included in the scope of the disclosure as defined in the claims. It should be understood that the above is a description of the present disclosure, which should not be considered as limited to the specific embodiments disclosed, and the intention to modify the disclosed embodiments and other embodiments is included in the scope of the appended claims. The present disclosure is limited by the appended claims.

What is claimed is:

1. A method for data processing based on location information, comprising:
    obtaining first location information from a first account;
    determining a geographic label to which the first location information belongs, and associating the first account with a first-level group corresponding to the geographic label;
    receiving an interaction request from the first account;
    matching, in response to the interaction request, at least one second account to interact with the first account in the first-level group associated with the first account;
    determining that the first account and the at least one second account belong to a same interaction group; and
    selecting a specific interaction group scene based on the geographic label and synchronously displaying the specific interaction group scene on display pages of devices corresponding to all accounts in the interaction group by sending second data to the accounts, wherein the specific interaction group scene comprises a landmark building scene reflecting the location information,
    wherein matching the at least one second account to interact with the first account in the first-level group associated with the first account comprises:
    determining a target matching number;
    determining a number of second accounts in the first-level group;
    when the number of second accounts in the first-level group is larger than or equal to the target matching number, determining, based on user level information of the first account, the target matching number of second accounts in the first-level group; and when the number of second accounts in the first-level group is smaller than the target matching number, monitoring a waiting time of the first account, and randomly determining the target matching number of second accounts in a second-level group in response to the waiting time exceeding a waiting threshold, wherein the first-level group belongs to a first division level comprising the geographic label, the second-level group belongs to a second division level comprising the geographic label, and the second division level is higher than the first division level.

2. The method according to claim 1, wherein obtaining the first location information from the first account comprises:

receiving the first location information from the first account, wherein the first location information received from the first account is obtained by one of the following:

obtaining the first location information based on information input through an input panel of the first device corresponding to the first account;

obtaining the first location information based on a voice received by the first device; or presenting a map on a display page of the first device and obtaining the first location information from coordinates on the map of an operation point received on the display page.

3. The method according to claim 1, wherein obtaining the first location information from the first account comprises:

requesting location authorization from the first account, and in a case where the location authorization is obtained, obtaining the first location information based on the location information of a positioning unit of the first device corresponding to the first account.

4. The method according to claim 1, wherein obtaining the first location information from the first account comprises:

receiving the first location information from the first account which is stored in a storage unit of the first device corresponding to the first account.

5. The method according to claim 1, wherein the first division level corresponds to a municipal administrative division level, and the second division level corresponds to a provincial administrative division level.

6. The method according to claim 1, further comprising:

sending first data to the accounts in the interaction group to present a combination success message of the interaction group on the display pages of the devices corresponding to the accounts in the interaction group.

7. The method according to claim 1, further comprising:

presenting a geographic knowledge question based on the geographic label on the display pages of the devices corresponding to the accounts in the interaction group.

8. An apparatus for data processing based on location information, comprising:

a processor; and a memory, comprising one or more computer-executable instructions, wherein the computer-executable instructions, when executed by the processor, cause the processor to:

obtain first location information from a first account;

determine a geographic label to which the first location information belongs, and associate the first account with a first-level group corresponding to the geographic label;

receive an interaction request from the first account;

match, in response to the interaction request, at least one second account to interact with the first account in the first-level group associated with the first account;

determine that the first account and the at least one second account belong to a same interaction group; and select a specific interaction group scene based on the geographic label and synchronously display the specific interaction group scene on display pages of devices corresponding to all accounts in the interaction group by sending second data to the accounts, wherein the specific interaction group scene comprises a landmark building scene reflecting the location information, wherein matching the at least one second account to interact with the first account in the first-level group associated with the first account comprises:

determining a target matching number;

determining a number of second accounts in the first-level group;

when the number of second accounts in the first-level group is larger than or equal to the target matching number, determining, based on user level information of the first account, the target matching number of second accounts in the first-level group; and when the number of second accounts in the first-level group is smaller than the target matching number, monitoring a waiting time of the first account, and randomly determining the target matching number of second accounts in a second-level group in response to the waiting time exceeding a waiting threshold, wherein the first-level group belongs to a first division level comprising the geographic label, the second-level group belongs to a second division level comprising the geographic label, and the second division level is higher than the first division level.

9. A computer device, comprising a processor, a memory, and a computer program stored on the memory, wherein the processor executes the computer program to:

obtain first location information from a first account;

determine a geographic label to which the first location information belongs, and associating the first account with a first-level group corresponding to the geographic label;

receive an interaction request from the first account;

match, in response to the interaction request, at least one second account to interact with the first account in the first-level group associated with the first account;

determine that the first account and the at least one second account belong to a same interaction group; and select a specific interaction group scene based on the geographic label and synchronously display the specific interaction group scene on display pages of devices corresponding to all accounts in the interaction group by sending second data to the accounts, wherein the specific interaction group scene comprises a landmark building scene reflecting the location information, wherein matching the at least one second account to interact with the first account in the first-level group associated with the first account comprises:

determining a target matching number;

determining a number of second accounts in the first-level group;

when the number of second accounts in the first-level group is larger than or equal to the target matching number, determining, based on user level information of the first account, the target matching number of second accounts in the first-level group; and when the number of second accounts in the first-level group is smaller than the target matching number, monitoring a waiting time of the first account, and randomly determining the target matching number of second accounts in a second-level group in response to the waiting time exceeding a waiting threshold, wherein the first-level group belongs to a first division level comprising the geographic label, the second-level group belongs to a second division level comprising the geographic label, and the second division level is higher than the first division level.

10. A non-transitory computer-readable storage medium on which a computer program is stored, wherein the computer program, upon being executed by a processor, causes the processor to:

obtain first location information from a first account;

determine a geographic label to which the first location information belongs, and associating the first account with a first-level group corresponding to the geographic label;

receive an interaction request from the first account;

match, in response to the interaction request, at least one second account to interact with the first account in the first-level group associated with the first account;

determine that the first account and the at least one second account belong to a same interaction group; and select a specific interaction group scene based on the geographic label and synchronously display the specific interaction group scene on display pages of devices corresponding to all accounts in the interaction group by sending second data to the accounts, wherein the specific interaction group scene comprises a landmark building scene reflecting the location information, wherein matching the at least one second account to interact with the first account in the first-level group associated with the first account comprises:

determining a target matching number;

determining a number of second accounts in the first-level group;

when the number of second accounts in the first-level group is larger than or equal to the target matching number, determining, based on user level information of the first account, the target matching number of second accounts in the first-level group; and when the number of second accounts in the first-level group is smaller than the target matching number, monitoring a waiting time of the first account, and randomly determining the target matching number of second accounts in a second-level group in response to the waiting time exceeding a waiting threshold, wherein the first-level group belongs to a first division level comprising the geographic label, the second-level group belongs to a second division level comprising the geographic label, and the second division level is higher than the first division level.

* * * * *